(12) United States Patent
Huang et al.

(10) Patent No.: US 11,257,194 B2
(45) Date of Patent: Feb. 22, 2022

(54) METHOD FOR IMAGE DEHAZING BASED ON ADAPTIVELY IMPROVED LINEAR GLOBAL ATMOSPHERIC LIGHT OF DARK CHANNEL

(71) Applicant: CHANG'AN UNIVERSITY, Xi'an (CN)

(72) Inventors: He Huang, Xi'an (CN); Jing Song, Xi'an (CN); Lu Guo, Xi'an (CN); Guiping Wang, Xi'an (CN); Xinrui Li, Xi'an (CN); Huifeng Wang, Xi'an (CN); Zhe Xu, Xi'an (CN); Bo Cui, Xi'an (CN); Ying Huang, Xi'an (CN); Xiaobin Hui, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 0 days.

(21) Appl. No.: 16/968,613

(22) PCT Filed: Dec. 29, 2018

(86) PCT No.: PCT/CN2018/125153
§ 371 (c)(1),
(2) Date: Aug. 10, 2020

(87) PCT Pub. No.: WO2019/205707
PCT Pub. Date: Oct. 31, 2019

(65) Prior Publication Data
US 2021/0049744 A1   Feb. 18, 2021

(30) Foreign Application Priority Data
Apr. 26, 2018   (CN) .......................... 201810387076.2

(51) Int. Cl.
| | | |
|---|---|---|
| *G06T 5/00* | (2006.01) | |
| *G06T 7/136* | (2017.01) | |
| *G06T 7/90* | (2017.01) | |

(52) U.S. Cl.
CPC .............. *G06T 5/003* (2013.01); *G06T 5/006* (2013.01); *G06T 7/136* (2017.01); *G06T 7/90* (2017.01); *G06T 2207/30192* (2013.01)

(58) Field of Classification Search
CPC ......... G06T 5/003; G06T 5/006; G06T 7/136; G06T 7/90; G06T 2207/30192
See application file for complete search history.

(56) References Cited

U.S. PATENT DOCUMENTS

| | | | |
|---|---|---|---|
| 9,288,458 B1 * | 3/2016 | Chen ...................... | H04N 9/646 |
| 2013/0050472 A1 * | 2/2013 | Omer ...................... | G06T 5/008 |
| | | | 348/135 |

(Continued)

FOREIGN PATENT DOCUMENTS

| | | |
|---|---|---|
| CN | 105654440 A | 6/2016 |
| CN | 106548461 A | 3/2017 |

(Continued)

OTHER PUBLICATIONS

He et al. ("Single Image Haze Removal Using Dark Channel Prior," IEEE Transactions on Pattern Analysis and Machine Intelligence, vol. 33, No. 12; Dec. 2011) (Year: 2011).*

(Continued)

*Primary Examiner* — Yubin Hung
(74) *Attorney, Agent, or Firm* — W&G Law Group

(57) ABSTRACT

A method for image dehazing based on adaptively improved linear global atmospheric light of a dark channel. A haze image in haze weather is first obtained, a variation angle of atmospheric light of the image is obtain through calculating a slope of a connection line between a center and a center of (Continued)

gravity of a binary image of the image, a linear atmospheric light map that varies regularly along a variation direction of the atmospheric light is obtains, a dehazed image is solved through an atmospheric scattering model, and then a processed haze image taken in the haze weather is output.

6 Claims, 3 Drawing Sheets

(56) References Cited

U.S. PATENT DOCUMENTS

| | | | | |
|---|---|---|---|---|
| 2014/0314332 | A1* | 10/2014 | Mudge | H04N 5/21 382/255 |
| 2016/0005152 | A1 | 1/2016 | Yang et al. | |
| 2017/0178297 | A1* | 6/2017 | Fattal | G06T 7/11 |
| 2018/0122051 | A1* | 5/2018 | Li | G06T 5/009 |
| 2019/0089869 | A1* | 3/2019 | Fleizach | H04N 1/6027 |
| 2019/0287219 | A1* | 9/2019 | Guo | G06T 7/00 |

FOREIGN PATENT DOCUMENTS

| | | |
|---|---|---|
| CN | 107451962 A | 12/2017 |
| CN | 108765309 A | 11/2018 |

OTHER PUBLICATIONS

Shi et al. ("Single Image Haze Removal Using Dark Channel Prior and Minimizing Energy Function," IEEE 2nd Information Technology, Networking, Electronic and Automation Control Conference: Date of Conference: Dec. 15-17, 2017) (Year: 2017).*

Wang et al. ("Improved single image dehazing using dark channel prior," IEEE International Conference on Intelligent Computing and Intelligent Systems; Date of Conference: Oct. 29-31, 2010) (Year: 2010).*

Ullah et al. ("Single image haze removal using improved dark channel prior," 5th International Conference on Modelling, Identification and Control; Date of Conference: Aug. 31-Sep. 2, 2013) (Year: 2013).*

Zhang et al. ("Single image haze removal based on saliency detection and dark channel prior," IEEE International Conference on Image Processing: Date of Conference: Sep. 17-20, 2017) (Year: 2017).*

Zhou et al. ("Single image haze removal using dark channel prior and fields of experts model," 11th International Conference on Fuzzy Systems and Knowledge Discovery; Date of Conference: Aug. 19-21, 2014) (Year: 2014).*

Xie et al. ("Improved Single Image Dehazing Using Dark Channel Prior and Multi-scale Retinex," International Conference on Intelligent System Design and Engineering Application: Date of Conference: Oct. 13-14, 2010) (Year: 2010).*

Chen et al. ("Haze Removal Using Radial Basis Function Networks for Visibility Restoration Applications," IEEE Transactions on Neural Networks and Learning Systems, vol. 29, Issue: 8; Aug. 2018) (Year: 2018).*

Yu et al. ("Ensemble Dehazing Networks for Non-homogeneous Haze," IEEE/CVF Conference on Computer Vision and Pattern Recognition Workshops; Date of Conference: Jun. 14-19, 2020) (Year: 2020).*

Saxena et al. ("Real Time Fog Removal Technique with Improved Quality through FFT," Fourth International Conference on Communication Systems and Network Technologies; Date of Conference: Apr. 7-9, 2014) (Year: 2014).*

Banerjee et al. ("Fuzzy logic based vision enhancement using sigmoid function," IEEE Calcutta Conference (CALCON); Date of Conference: Dec. 2-3, 2017) (Year: 2017).*

International Search Report (PCT/CN2018/125153); dated Apr. 8, 2019.

* cited by examiner

METHOD FOR IMAGE DEHAZING BASED ON ADAPTIVELY IMPROVED LINEAR GLOBAL ATMOSPHERIC LIGHT OF DARK CHANNEL

CROSS REFERENCE TO RELATED APPLICATIONS

The present application is based on International Application No. PCT/CN2018/125153, filed on Dec. 29, 2018, which claims priority to Chinese Patent Application No. 201810387076.2, filed on Apr. 26, 2018, the contents of which are incorporated herein by reference in their entireties.

TECHNICAL FIELD

The present disclosure relates to the technical field of image processing, and in particular, to a method for image dehazing based on adaptively improved linear global atmospheric light of a dark channel.

BACKGROUND

Since dust particles and water vapor in the air will absorb and scatter light in the haze weather, which causes light intensity received by a sensor to change, images captured in haze weather will be affected by the weather and thus has a reduced quality. The clarity of scenes located in a haze image is lower than that the clarity of scenes located in an image taken on fine days, which may result in limitation of some image-based applications, such as traffic safety monitoring and target recognition in aerial surveillance. The image dehazing technology can eliminate or reduce effect of the haze weather on the image quality, so it has practical significance.

At present, there are already some algorithms that can dehaze a single image, and these algorithms can be divided, in principle, into enhancement methods based on image processing and restoration methods based on physical models. The enhancement algorithms based on image processing include histogram equalization, a Retinex algorithm and the like, and the restoration algorithms based on physical models include a Tan algorithm, a Fattal algorithm, a He algorithm and the like.

In 2009, He et al. proposed, at the CVPR conference, single image haze removal using dark channel prior, achieved a better dehazing effect and then improved the algorithm accordingly. This algorithm applies a prior statistical law of the dark primary colors to a physical model, i.e., an atmospheric scattering model, successively calculates a dark primary color map, an atmospheric light value, a rough propagation map and a fine propagation map, and finally substitutes the atmospheric scattering model to obtain a dehazed image. However, after a lot of experiments, it is found that when the algorithm of He et al. is used to deal with images captured in dense haze, it is impossible to have both contrast of a dark area and details of a bright area after a selected atmospheric light value is used to process the image, due to uneven illumination.

SUMMARY

An object of the present disclosure is to provide an method for image dehazing based on adaptively improved linear global atmospheric light of a dark channel, and it replaces the global atmospheric light value with the atmospheric light map to avoid the image distortion caused by an excessively large difference between the atmospheric light value of the dense haze part and the atmospheric light value of the close scene part after dehazing due to uneven distribution of the atmospheric light in dense haze weather. The present disclosure can not only maintain the contrast of the dark area of the image, but also can show the details of the scene in the bright area.

In order to achieve the object above, the present disclosure adopts a following technical solution.

A method for image dehazing based on adaptively improved linear global atmospheric light of a dark channel, includes:

step 1: obtaining a haze image in haze weather;

step 2: performing threshold segmentation on the haze image obtained in the step 1 to obtain a binary image;

step 3: obtaining a center of gravity ($x_0$ $y_0$) of the image and a center (0.5*h 0.5*w) of the image for the binary image obtained in the step 2, where h is height of the binary image and w is width of the binary image, then performing normalization by dividing horizontal coordinates and vertical coordinates corresponding to the center of gravity and the image center of the binary image by h and w respectively, so as to obtain a center of gravity ($x_0'$ $y_0'$) and a center (0.50.5), where k is defined as a slope and $\theta$ is defined as a deflection angle of an atmospheric light value, where $$k = \frac{y_0' - 0.5}{x_0' - 0.5},$$

and $\theta = \arctan(1/k)$;

step 4: calculating the dark channel of the haze image I obtained in the step 1:

$$I_{dark}(x,y) = \min_{C \in \{r,g,b\}}(\min_{(x',y') \in \Omega(x,y)}(I_C(x',y')))$$

where $\Omega(x, y)$ represents a window of neighborhood of a point (x, y), $I_{dark}'(x, y)$ represents a dark channel image, and $I_C(x',y')$ represents a monochrome channel image pixel of the haze image I, rotating the image dark channel $I_{dark}(x, y)$ counterclockwise according to the deflection angle $\theta$ obtained in the step 3, to obtain the rotated dark channel $I_{dark}'(x, y)$;

step 5: obtaining an evenly varied atmospheric light map A'(x, y) for the dark channel obtained in the step 4;

step 6: counterclockwise rotating the evenly varied atmospheric light map A'(x, y) obtained in the step 5 according to the atmospheric light value deflection angle $\theta$ obtained in the step 3, to obtain a final atmospheric light map A (x, y), which is distributed regularly according to a variation direction of the concentration degree of the haze; and step 7: obtaining a dehazed image based on an atmospheric scattering model, wherein the atmospheric scattering model is as follows:

$$I(x,y) = J(x,y)t(x,y) + A(x,y)(1-t(x,y)),$$

where J represents the dehazed image, and t represents transmittance, A represents the final atmospheric light map A (x, y) obtained in the step 6.

Further, in the step 4, $\Omega(x, y)$ represents an image block of 9*9.

Further, obtaining the evenly varied atmospheric light map A'(x, y) in the step 5 is as follows:

sorting, from large to small, each row of dark channel values of the rotated dark channel image $I_{dark}'(x, y)$, taking a minimum value of the first 0.1% as the atmospheric light value of the row, and obtaining the atmospheric light value of each row in turn, to obtain an initial atmosphere light map $A_0(x, y)$; filtering the initial atmospheric light map, to obtain the evenly varied atmospheric light map A'(x, y).

Further, in the step 5, a mean filtering method is used to filter the initial atmospheric light map.

Further, said obtaining the dehazed image in the step 7 is specifically as follows:

according to a statistical law of dark primary colors, the dark primary colors of the dehazed image J approach 0, that is:

$$J_{dark}(x,y)=\min_C(\min_{(x',y')\in\Omega(x,y)}(J_C(x',y')))=0,$$

where $J_{dark}(x, y)$ represents a dark channel pixel of the dehazed image, $\Omega(x, y)$ represents the window of the neighborhood of the point (x, y), and $J_C(x', y')$ represents a monochrome channel image pixel of the haze image J (x, y);

where A is always positive, then:

$$\min_C(\min_{(x',y')\in\Omega(x,y)}(J_C(x',y')/A(x',y')))=0$$

a rough transmittance diagram is obtained as:

$$t'(x,y)=1-\min_C(\min_{(x',y')\in\Omega(x,y)}(I_C(x',y')/A(x',y')));$$

in clear day, when a distant scene is shielded by little haze, a factor ω is added in order to make a dehazing effect undistorted:

$$t(x,y)=1-\omega\min_C(\min_{(x',y')\in\Omega(x,y)}(I_C(x',y')));$$

solving the dehazed image J using I, t and A and outputting the dehazed image J, where $$J(x,y)=(I(x,y)-A(x,y)/t(x,y)+A(x,y).$$

Further, the factor ω is 0.95.

Compared with the related art, the present disclosure has following beneficial technical effects.

The present disclosure replaces the traditional global atmospheric light value with the atmospheric light map, to make the atmospheric light value of the image be linearly distributed. In the traditional dehaze algorithm, a dark channel algorithm can dehaze most haze images, and the effect is good. However, in a process of dehazing an image in which a depth of field is relatively deep and a haze density of the distant scene is much greater than that of the close area, if a same atmospheric light is used globally to make the effect of the close area of the image good, the brightness in the distant area is too large, which causes a severe distortion, or if the effect in the distance area is good, a brightness value in the close area is too small, which results in loss of details. The present method replaces the original global atmospheric light value with an adaptive linear atmospheric light map, which changes along a direction in which a concentration degree of the haze varies, making the dark channel dehaze algorithm be capable of achieving a good effect even in the dense haze and the area having a relatively large depth of field, so that it has a good dehazing effect, good restoration of the distant scene, and an ideal effect on image processing in the haze weather, and it is of great significance to the further processing of images and accurate acquisition of image information.

DESCRIPTION OF EMBODIMENTS

The present disclosure will be described in further detail below with reference to the drawings.

Figure 1:
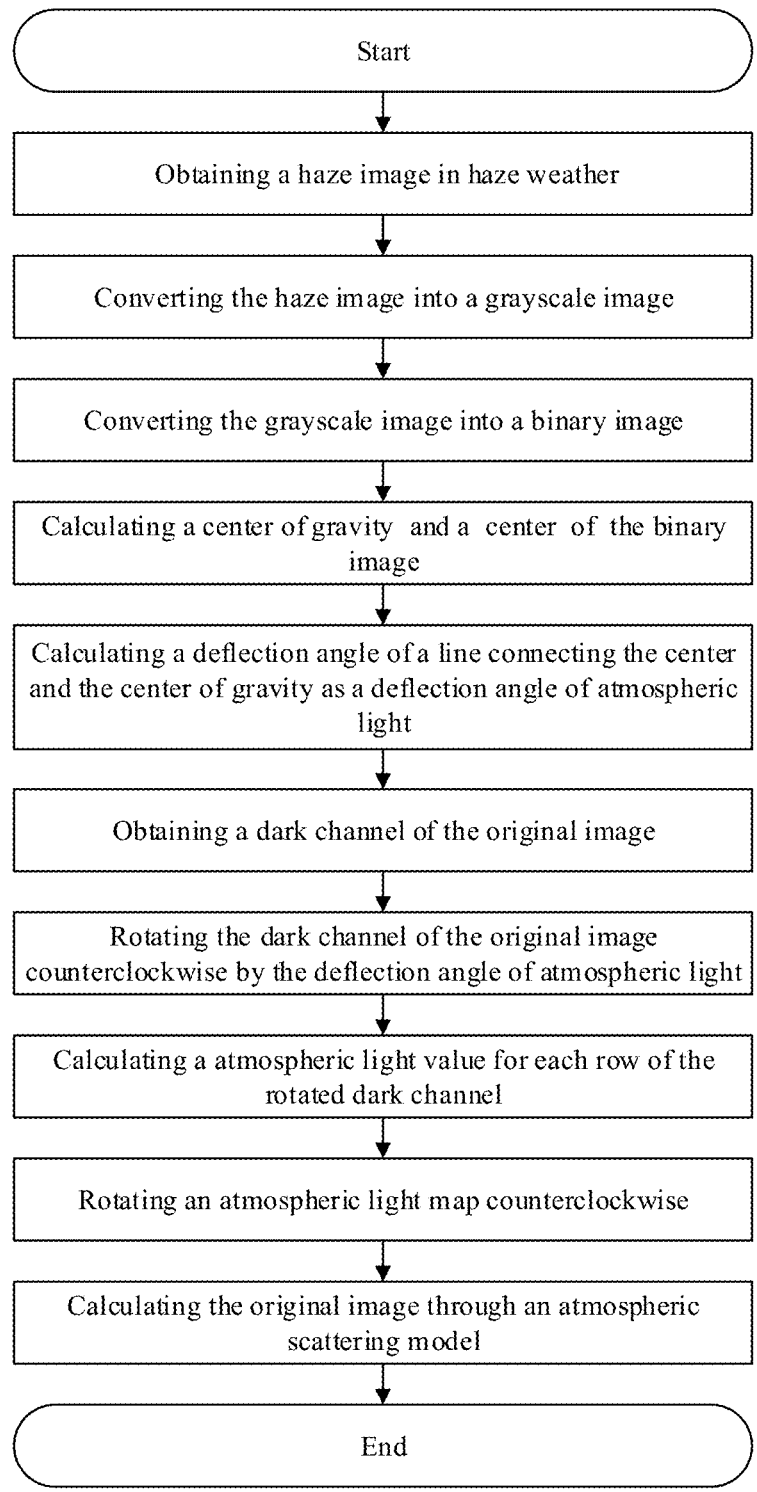
FIG. 1 is a flowchart according to the present disclosure.

Referring to FIG. 1, a method for image dehazing based on adaptively improved linear global atmospheric light of a dark channel includes following steps.

At step 1, a haze image is obtained in haze weather.

Using an image capture device to obtain a degraded haze image in the haze weather.

At step 2, threshold segmentation is performed on the haze image obtained in the step 1 to obtain a binary image thereof.

The image is first converted into a grayscale image, and then the threshold segmentation is performed on the grayscale image through Otsu algorithm to convert the grayscale image into the binary image.

At step 3, a center of gravity $(x_0\ y_0)$ and an image center (0.5*h 0.5*w) of the binary image (height is h and width is w) in the step 2 are obtained. A normalization is performed by dividing horizontal coordinates and vertical coordinates corresponding to the center of gravity and the image center of the binary image by h and w respectively, so as to obtain a center of gravity $(x_0'\ y_0')$ and a center (0.5 0.5), where k is defined as a slope and θ is defined as a deflection angle of an atmospheric light value, where $$k=\frac{y_0'-0.5}{x_0'-0.5},$$

and $$\theta=\arctan(1/k),$$

in this case, the concentration degree of haze in the image substantially varies and distributes along a direction in which a center line is deflected clockwise by θ.

At step 4, the binary image obtained in the step 2 in which the binary image is subjected to grayscale conversion and binary segmentation is divided into two parts including a bright area and a dark area, and then the center of gravity and the center of the binary image are calculated through the step 3, and a direction in which a line connecting the center of gravity with the center extends is taken as a variation direction of the atmospheric light to tilt the image.

A dark channel of the haze image obtained in the step 1 is obtained according to:

$$I_{dark}(x,y)=\min_{C\in\{r,g,b\}}(\min_{(x',y')\in\Omega(x,y)}(I_C(x',y'))),$$

where ω(x, y) represents a window of a neighborhood of a point (x, y), $I_{dark}$(x, y) represents a dark channel image, and $I_C$(x', y') represents a monochrome channel image pixel of the haze image I.

The image dark channel $I_{dark}$(x, y) is rotated counterclockwise according to the deflection angle θ obtained in the step 3, to obtain the rotated dark channel. $I_{dark}$'(x, y).

At step 5, a distribution map of the atmospheric light of the rotated dark channel obtained in the step 4 is obtained and the acquisition includes sorting, from large to small, each row of dark channel values of the rotated dark channel image $I_{dark}$'(x, y), taking a minimum value among first 0.1% of the row of dark channel values as an atmospheric light value of the row, to obtain the atmospheric light value for the row, to obtain an initial atmosphere light map $A_0$(x, y); and filtering the initial atmospheric light map through a mean filtering method to eliminate an abrupt change in each row of the atmospheric light map, to obtain an evenly varied atmospheric light map A'(x, y).

At step 6, the evenly varied atmospheric light map A'(x, y) obtained in the step 5 is rotated counterclockwise by the atmospheric light value deflection angle θ obtained in the step 3, to obtain a final atmospheric light map A(x, y), which is distributed regularly according to a variation direction of the concentration degree of the haze.

At step 7, an atmospheric scattering model commonly used in research of dehaze algorithms is as follows:

$$I(x,y)=J(x,y)t(x,y)+A(x,y)(1-t(x,y)),$$

where J represents a dehazed image, and t represents transmittance. A represents the final atmospheric light map A (x, y) obtained in the step 6.

According to a statistical law of dark primary colors, the dark primary colors of the dehazed image J should approach 0, that is:

$$J_{dark}(x,y)=\min_C(\min_{(x',y')\in \Omega(x,y)}(J_C(x',y')))=0$$

where $J_{dark}$(x, y) represents a dark channel pixel of the dehazed image, Ω(x, y) represents the window of the neighborhood of the point (x, y), and $J_C$(x', y') represents a monochrome channel image pixel of a haze image J(x, y).

As A is always positive, this leads to:

$$\min_C(\min_{(x',y')\in\Omega(x,y)}(J_C(x',y')/A(x',y')))=0.$$

A rough transmittance diagram can be obtained:

$$t'(x,y)=1-\min_C(\min_{(x',y')\in\Omega(x,y)}(I_C(x',y')/A(x',y')))).$$

In a clear day, when a distant scene is shielded by little haze, a factor ω is further added to the above formula in such a manner that a dehazing effect is undistorted. The ω is generally about 0.95.

$$t(x,y)=1-\omega\min_C(\min_{(x',y')\in\Omega(x,y)}(I_C(x',y'))).$$

The I, t and A can be used to solve the dehazed clear image J, and the dehazed clear image J is output.

$$J(x,y)=(I(x,y)-A(x,y))/t(x,y)+A(x,y).$$

Figure 2:
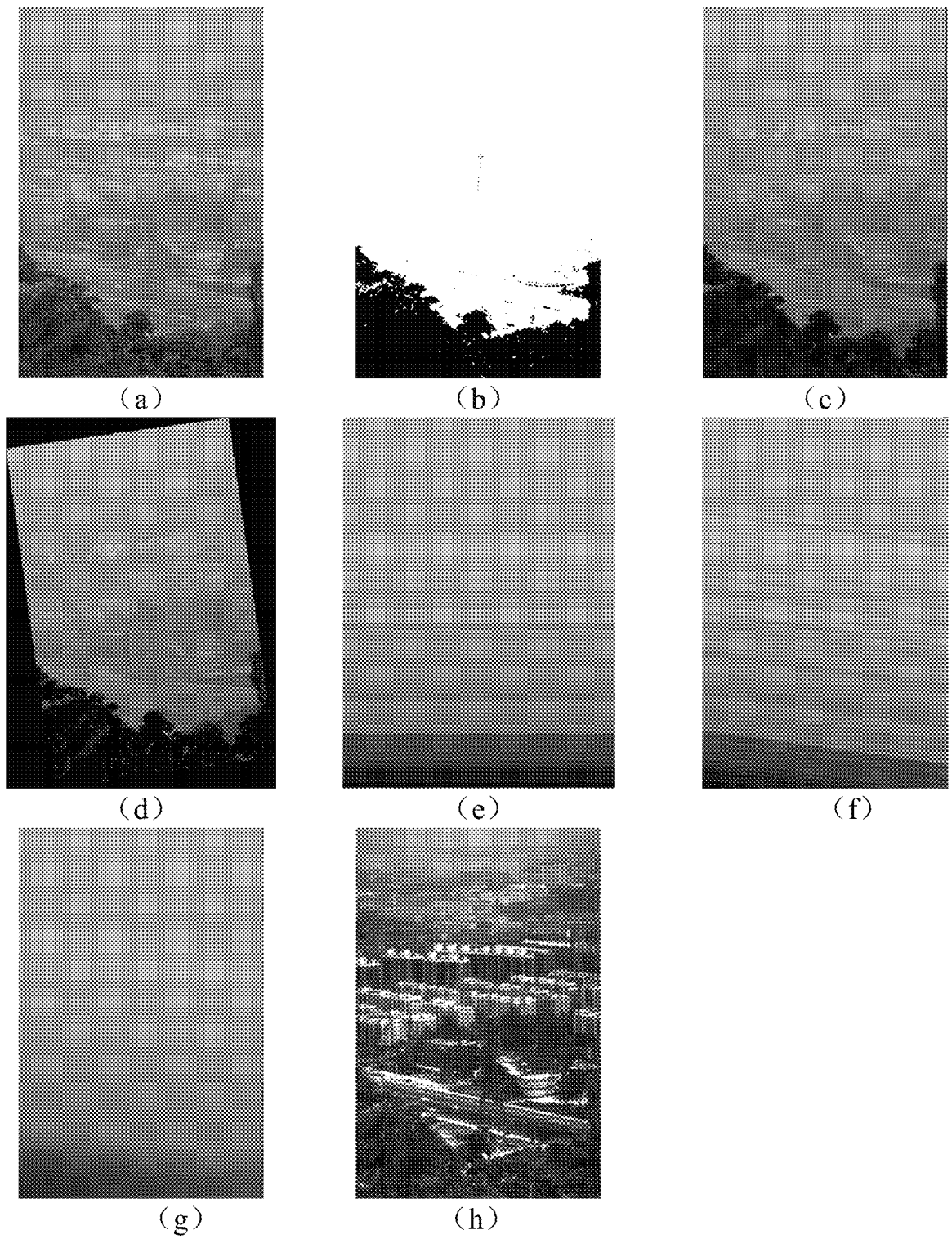
FIG. 2 is a diagram illustrating various processes in the present disclosure, where (a) illustrates an original haze image; (b) illustrates a binary image of the haze image, in which a lower end point of a connection line is a center, and an upper end point of the connection line is a center of gravity; (c) illustrates a dark channel of the haze image; (d) illustrates a rotated dark channel; (e) illustrates an atmospheric light map of the rotated dark channel; (f) illustrates a rotated-back atmospheric light map; (g) illustrates an evenly varied atmospheric light map after filtering; and (h) illustrates an image after being processed according to the present method.

FIG. 2 illustrates a process of processing the haze image with the algorithm provided by the present disclosure, where (a) illustrates an original haze image, (b) illustrates a binary image of the haze image in which a connection line is the line connecting the center and the center of gravity, (c) illustrates the dark channel of the haze image, (d) illustrates the dark channel that has been rotated counterclockwise with the rotation angle being the connection line connecting the center of gravity with the center shown in FIG. (b), (e) illustrates the atmospheric light map obtained by acquiring the atmospheric light value of each row for the rotated dark channel, (f) illustrates the atmospheric light map obtained by clockwise rotating the atmospheric light map in FIG. (e) back and cutting it, (g) illustrates the evenly varied atmospheric light map after filtering, and (e) illustrates the processed clear image.

Figure 3:
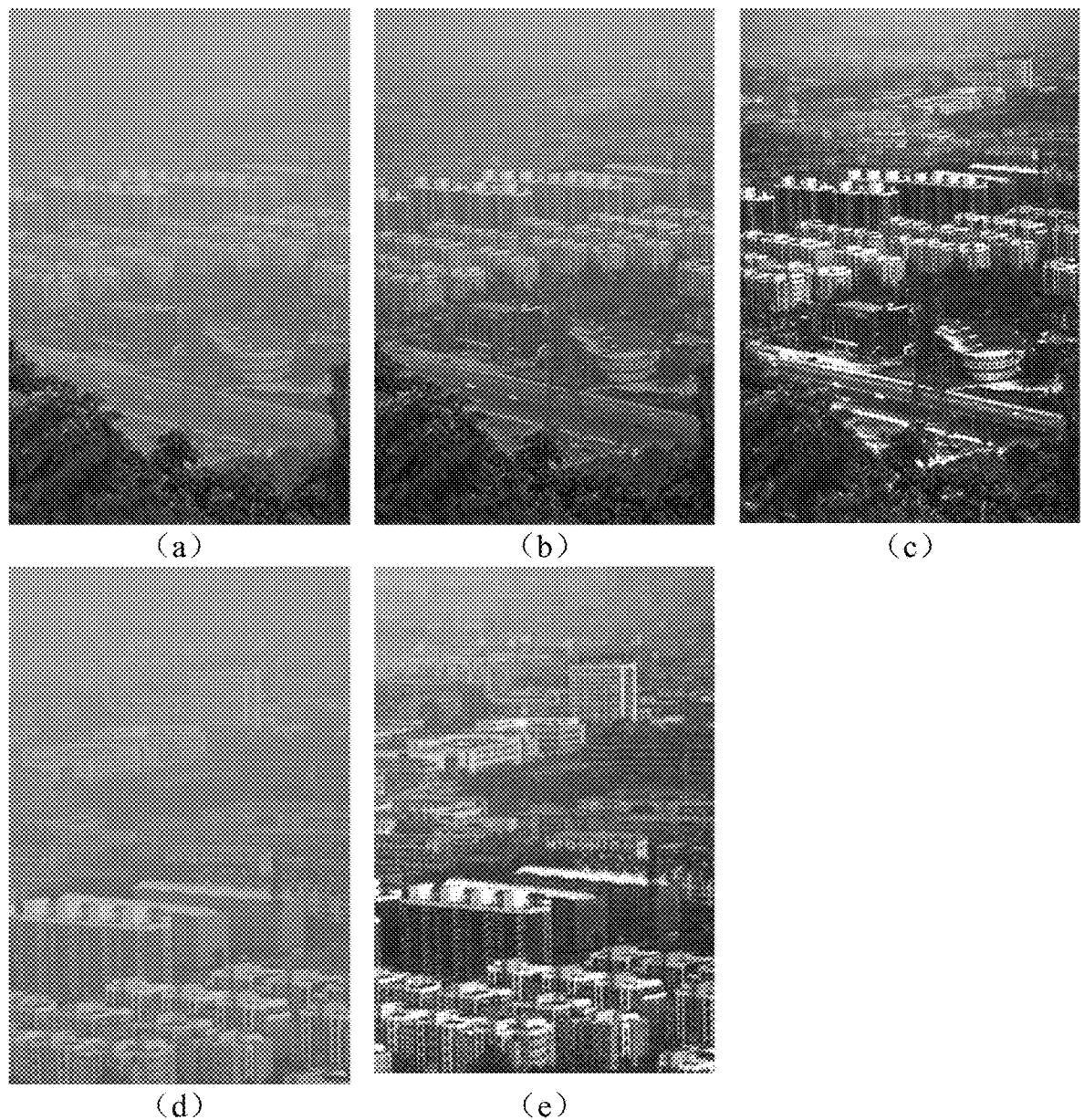
FIG. 3 is a diagram illustrating comparison of dehaze results according to the present disclosure and a conventional dark channel, where (a) illustrates an original haze image; (b) illustrates an image processed according to a traditional dark channel, (c) illustrates an image processed according to the present disclosure, (d) illustrates an enlarged view of some details of the imaged processed with the traditional dark channel, and (e) illustrates an enlarged view of some details of the image processed with the present disclosure.

A processing effect can be more intuitively seen from processing result comparison and a partially enlarged diagram of FIG. 3. FIG. 3(a) is an original haze image, and there is a distant scene and a close scene in the image where a farther area is blurred. FIG. 3(b) illustrates a processing result by using a traditional dark channel theory, and it can be seen that after processing, some haze is removed while some haze is still retained, especially the distant part which makes the image blurred. A processing result by using the method provided according to the present disclosure is illustrated in FIG. 3(c), in which an overall image is basically dehazed and relatively clear. FIG. 3(d) illustrates an enlarged diagram of details of the distant view of the traditional dark channel, and it can be seen that there is still some haze in the image, making the image relatively blurred. FIG. (e) illustrates an enlarged diagram of the details of the distant view of the image after processing by using the present disclosure, and it can be seen that the haze is removed more thorough, and clarity is improved compared with FIG. 3(d).

Table 1 is a comparison table of effect parameters by using different algorithms to process the haze image. It can be seen from Table 1 that after the image is dehazed by the improved dark channel dehazing method of the present disclosure, ambiguity, average gradient, contrast, and information entropy are all improved. Thus, it can be seen that the present disclosure further improves the processing effect for the haze image and has better result, so that it is superior to the traditional dark channel dehazing method and has important significance for further research on image dehazing, haze image information extraction and the like.

TABLE 1

Parameter comparison table of effect by using different algorithms to process the haze image

| Image | Ambiguity | Average gradient | Information entropy | Contrast |
|---|---|---|---|---|
| (a) |  | 0.0266 | 0.0073 | 0.0877 |
| (b) | 5.4150 | 0.1990 | 0.0591 | 0.5864 |
| (c) | 9.0345 | 0.3199 | 0.0854 | 0.6402 |

According to the description above, the improved dark channel image dehazing algorithm of the present disclosure has a good dehazing effect, good restoration of the distant scene, and an ideal effect on processing of images captured in the haze weather, and it is of great significance to the further processing of images and accurate acquisition of image information.

What is claimed is:

1. A method for image dehazing based on adaptively improved linear global atmospheric light of a dark channel, comprising:
   step 1: obtaining a haze image in haze weather;
   step 2: performing threshold segmentation on the haze image obtained in the step 1 to obtain a binary image;
   step 3: obtaining a center of gravity ($x_0$ $y_0$) and an image center (0.5*h 0.5*w) of the binary image obtained in the step 2, where h is a height of the binary image and w is a width of the binary image, then performing normalization by dividing horizontal coordinates and vertical coordinates corresponding to the center of gravity and the image center of the binary image by h and w respectively, so as to obtain a center of gravity $(x_0', y_0')$ and a center $(0.5, 0.5)$, where k is defined as a slope and θ is defined as a deflection angle of an atmospheric light value, where $$k = \frac{y_0' - 0.5}{x_0' - 0.5},$$

and

θ=arctan(1/k);

step 4: calculating the dark channel $I_{dark}(x, y)$ of the haze image I obtained in the step 1, and rotating the dark channel $I_{dark}(x, y)$ of the haze image counterclockwise based on the deflection angle θ obtained in the step 3, to obtain the rotated dark channel $I_{dark}'(x, y)$, where $$I_{dark}(x,y)=\min_{C \in \{r,g,b\}}(\min_{(x',y') \in \Omega(x,y)}(I_C(x',y'))),$$

where $\Omega(x, y)$ represents a window of a neighborhood of a point $(x, y)$, $I_{dark}'(x, y)$ represents a dark channel image, and $I_C(x', y')$ represents a monochrome channel image pixel of the haze image I;

step 5: obtaining an evenly varied atmospheric light map $A'(x, y)$ for the rotated dark channel obtained in the step 4;

step 6: counterclockwise rotating the evenly varied atmospheric light map $A'(x, y)$ obtained in the step 5 by the deflection angle θ of the atmospheric light value obtained in the step 3, to obtain a final atmospheric light map $A(x, y)$ that is distributed regularly based on a variation direction of a concentration degree of haze; and step 7: obtaining a dehazed image based on an atmospheric scattering model, wherein the atmospheric scattering model is:

$$I(x,y)=J(x,y)t(x,y)+A(x,y)(1-t(x,y)),$$

where J represents the dehazed image, t represents transmittance, and $A(x, y)$ represents the final atmospheric light map $A(x, y)$ obtained in the step 6.

2. The method for image dehazing based on the adaptively improved linear global atmospheric light of the dark channel according to claim 1, wherein $\Omega(x, y)$ in the step 4 represents an image block of 9*9.

3. The method for image dehazing based on the adaptively improved linear global atmospheric light of the dark channel according to claim 1, wherein said obtaining the evenly varied atmospheric light map $A'(x, y)$ in the step 5 comprises:

sorting, from large to small, each row of dark channel values of the rotated dark channel image $I_{dark}'(x, y)$, taking a minimum value among first 0.1% of the row of dark channel values as an atmospheric light value of the row, and obtaining the atmospheric light value of the row, to obtain an initial atmosphere light map $A_0(x, y)$; and filtering an initial atmospheric light map, to obtain the evenly varied atmospheric light map $A'(x, y)$.

4. The method for image dehazing based on the adaptively improved linear global atmospheric light of the dark channel according to claim 3, wherein a mean filtering method is used to filter the initial atmospheric light map in the step 5.

5. The method for image dehazing based on the adaptively improved linear global atmospheric light of the dark channel according to claim 1, wherein said obtaining the dehazed image in the step 7 comprises:

setting dark primary colors of the dehazed image J to approach 0 based on a statistical law of the dark primary colors as:

$$J_{dark}(x,y)=\min_C(\min_{(x',y') \in \Omega(x,y)}(J_C(x',y')))=0$$

where $J_{dark}(x, y)$ represents a dark channel pixel of the dehazed image, $\Omega(x, y)$ represents the window of the neighborhood of the point $(x, y)$, and $J_C(x', y')$ represents a monochrome channel image pixel of a haze image $J(x, y)$, wherein A is always positive, and $\min_C(\min_{(x',y') \in \Omega(x,y)} J_C(x', y')/A(x', y'))=0$;

obtaining a rough transmittance diagram:

$$t'(x,y)=1-\min_C(\min_{(x',y') \in \Omega(x,y)} I_C(x',y')/A(x',y')),$$

wherein in a clear day when a distant scene is shielded by little haze, a factor ω is added in such a manner that a dehazing effect is undistorted, where $$t(x,y)=1-\omega\min_C(\min_{(x',y') \in \Omega(x,y)}(I_C(x',y'))); \text{ and}$$

solving the dehazed image J using I, t and A and outputting the dehazed image J, where $$J(x,y)=(I(x,y)-A(x,y))/t(x,y)+A(x,y).$$

6. The method for image dehazing based on the adaptively improved linear global atmospheric light of the dark channel according to claim 5, wherein the factor ω is 0.95.

* * * * *